(12) United States Patent
Hasegawa et al.

(10) Patent No.: US 11,905,755 B2
(45) Date of Patent: Feb. 20, 2024

(54) METHOD FOR MANUFACTURING GLASS PANEL UNIT

(71) Applicant: Panasonic Intellectual Property Management Co., Ltd., Osaka (JP)

(72) Inventors: Kazuya Hasegawa, Osaka (JP); Hiroyuki Abe, Osaka (JP); Haruhiko Ishikawa, Osaka (JP); Tasuku Ishibashi, Ishikawa (JP); Eiichi Uriu, Osaka (JP); Takeshi Shimizu, Osaka (JP); Masataka Nonaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 548 days.

(21) Appl. No.: 17/256,639

(22) PCT Filed: May 23, 2019

(86) PCT No.: PCT/JP2019/020557
§ 371 (c)(1),
(2) Date: Dec. 28, 2020

(87) PCT Pub. No.: WO2020/003830
PCT Pub. Date: Jan. 2, 2020

(65) Prior Publication Data
US 2021/0262280 A1 Aug. 26, 2021

(30) Foreign Application Priority Data
Jun. 29, 2018 (JP) .................................. 2018-125447

(51) Int. Cl.
*E06B 3/673* (2006.01)
*B32B 17/10* (2006.01)
(Continued)

(52) U.S. Cl.
CPC ............ *E06B 3/6736* (2013.01); *B32B 17/10* (2013.01); *C03C 27/06* (2013.01); *E06B 3/6612* (2013.01);
(Continued)

(58) Field of Classification Search
CPC .. E06B 3/6736; E06B 3/6612; E06B 3/66342; E06B 3/6775; E06B 3/66333;
(Continued)

(56) References Cited

U.S. PATENT DOCUMENTS 10,597,933 B2 3/2020 Abe et al.
2005/0035716 A1 2/2005 Kado et al.
(Continued)

FOREIGN PATENT DOCUMENTS

EP 3805173 A1 4/2021
JP 2001-351525 A 12/2001
(Continued)

OTHER PUBLICATIONS

Extended European Search Report issued in corresponding European Patent Application No. 19824691.0, dated Sep. 16, 2021.
(Continued)

*Primary Examiner* — George R Koch
(74) *Attorney, Agent, or Firm* — Rimon P.C.

(57) ABSTRACT

A method for manufacturing a glass panel unit includes a glue arrangement step, an assembly forming step, a first melting step, an evacuation step, and a second melting step. The first melting step includes melting a hot glue, bonding a first and second panel with the glue, and forming an internal space. The first melting step includes a first temperature raising step, a first temperature maintaining step including maintaining the temperature of the assembly at a temperature equal to or higher than a softening point of the hot glue, and a first temperature lowering step, which are
(Continued)

performed in this order. The first temperature lowering step includes: an anterior temperature lowering step including lowering the temperature of the assembly; a middle temperature maintaining step including maintaining the temperature of the assembly; and a posterior temperature lowering step including lowering the temperature of the assembly, which are performed in this order.

3 Claims, 10 Drawing Sheets

(51) Int. Cl.
*C03C 27/06* (2006.01)
*E06B 3/66* (2006.01)
*E06B 3/663* (2006.01)
*E06B 3/677* (2006.01)

(52) U.S. Cl.
CPC ........ *E06B 3/66342* (2013.01); *E06B 3/6775* (2013.01); *E06B 3/66333* (2013.01); *E06B 2003/66338* (2013.01)

(58) Field of Classification Search
CPC ........... E06B 2003/66338; B32B 17/10; C03C 27/06; B29C 66/9192; B29C 66/91921
See application file for complete search history.

(56) References Cited

U.S. PATENT DOCUMENTS

| | | | |
|---|---|---|---|
| 2009/0297862 A1 | 12/2009 | Boek et al. | |
| 2011/0256407 A1* | 10/2011 | Boek | C03C 27/06 428/428 |
| 2015/0068666 A1* | 3/2015 | Abe | E06B 3/677 156/109 |
| 2016/0001524 A1* | 1/2016 | Abe | E06B 3/6612 428/33 |
| 2018/0283087 A1 | 10/2018 | Abe et al. | |
| 2018/0290435 A1 | 10/2018 | Abe et al. | |
| 2018/0320436 A1 | 11/2018 | Abe et al. | |
| 2021/0131169 A1 | 5/2021 | Shimizu et al. | |

FOREIGN PATENT DOCUMENTS

| | | |
|---|---|---|
| JP | 2011-623617 A | 8/2011 |
| JP | 2016-074601 A | 5/2016 |
| WO | 2013/172033 A1 | 11/2013 |
| WO | 2014/136151 A1 | 9/2014 |
| WO | 2017/056422 A1 | 4/2017 |

OTHER PUBLICATIONS

International Search Report issued in corresponding International Patent Application No. PCT/JP2019/020557, dated Jul. 16, 2019, with English translation.

* cited by examiner

METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/020557, filed on May 23, 2019, which in turn claims the benefit of Japanese Application No. 2018-125447, filed on Jun. 29, 2018, the entire disclosures of which Applications are incorporated by reference herein.

TECHNICAL FIELD

The present invention generally relates to a method for manufacturing a glass panel unit, and more particularly relates to a method for manufacturing a glass panel unit including exhausting a gas from an internal space of an assembly including a first panel, a second panel, and a hot glue.

BACKGROUND ART

Patent Literature 1 discloses a multi-pane glazing unit. The multi-pane glazing unit of Patent Literature 1 includes a pair of glass panes and a frit seal that hermetically bonds the pair of glass panes together. The frit seal has a discontinuous portion as a gap portion such that a gas is exhausted through the discontinuous portion from an internal space surrounded with the pair of glass panes and the frit seal.

To manufacture the known multi-pane glazing unit, the frit seal is arranged between the pair of glass panes to hermetically bond the pair of glass panes together with the frit seal, a gas is exhausted from the internal space, and then the discontinuous portion is sealed up. While the gas is being exhausted from the internal space, the frit seal heated comes to have a high-temperature portion and is deformed, thus possibly closing the discontinuous portion.

CITATION LIST

Patent Literature

Patent Literature 1: WO 2013/172033 A1

SUMMARY OF INVENTION

It is therefore an object of the present disclosure to provide a method for manufacturing a glass panel unit which reduces the chances of either an exhaust port or an air passage leading to the exhaust port being closed.

A method for manufacturing a glass panel unit according to an embodiment of the present disclosure includes a glue arrangement step, an assembly forming step, a first melting step, an evacuation step, and a second melting step.

The glue arrangement step includes arranging a hot glue on either a first panel including a first glass pane or a second panel including a second glass pane.

The assembly forming step includes forming an assembly including the first panel, the second panel, and the hot glue and having an exhaust port provided through at least one of the first panel, the second panel, or the hot glue by arranging the second panel such that the second panel faces the first panel.

The first melting step includes heating the assembly to melt the hot glue, bonding the first panel and the second panel together with the hot glue thus melted, and thereby forming an internal space surrounded, except the exhaust port, with the first panel, the second panel, and the hot glue melted.

The evacuation step includes reducing pressure in the internal space by evacuation that involves exhausting a gas from the internal space via the exhaust port.

The second melting step includes creating a hermetically sealed evacuated space by heating the assembly and thereby melting the hot glue while maintaining a reduced pressure in the internal space to close the exhaust port and seal the internal space up.

The first melting step includes a temperature raising step, a temperature maintaining step, and a temperature lowering step, which are performed in this order. The temperature raising step includes raising a temperature of the assembly to a temperature equal to or higher than a softening point of the hot glue. The temperature maintaining step includes maintaining the temperature of the assembly at the temperature equal to or higher than the softening point. The temperature lowering step includes lowering the temperature of the assembly to a temperature less than the softening point.

The temperature lowering step includes: an anterior temperature lowering step including lowering the temperature of the assembly; a middle temperature maintaining step including maintaining the temperature of the assembly; and a posterior temperature lowering step including lowering the temperature of the assembly. The anterior temperature lowering step, the middle temperature maintaining step, and the posterior temperature lowering step are performed in this order.

DESCRIPTION OF EMBODIMENTS

The first to third embodiments to be described below generally relate to a method for manufacturing a glass panel unit, and more particularly relate to a method for manufacturing a glass panel unit including exhausting a gas from an internal space of an assembly including a first panel, a second panel, and a hot glue.

A method for manufacturing a glass panel unit according to a first embodiment will be described with reference to FIGS. 1-8.

Figure 1:
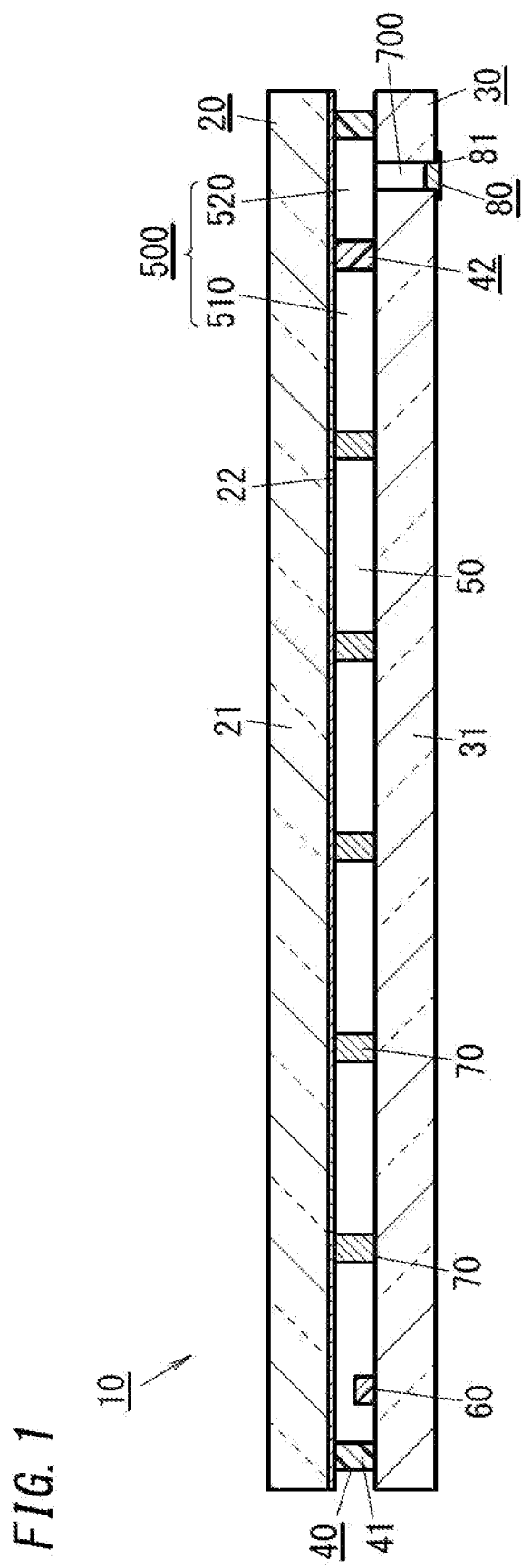
FIG. 1 is a schematic cross-sectional view of a glass panel unit according to a first embodiment.
Figure 2:
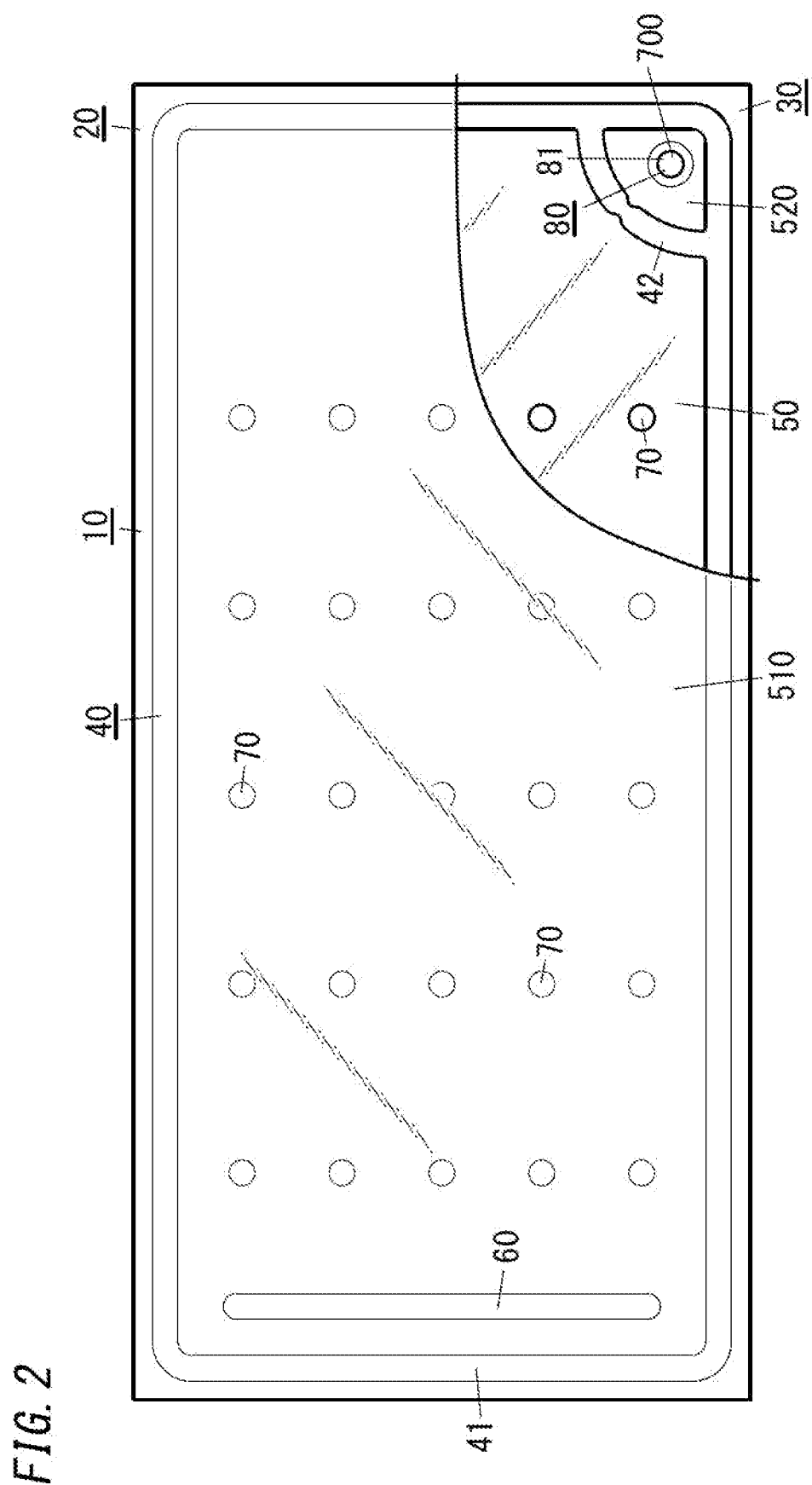
FIG. 2 is a partially cutaway, schematic plan view of the glass panel unit.

FIGS. 1 and 2 illustrate a glass panel unit (which is a glass panel unit as a final product) 10 according to the first embodiment. The glass panel unit 10 according to the first embodiment is a thermal insulation glazing unit. The thermal insulation glazing unit is a type of a multi-pane glazing unit (multi-pane glass panel unit) including at least a pair of glass panels and having an evacuated space (which may be a vacuum space) between the pair of glass panels.

The glass panel unit 10 according to the first embodiment includes a first panel 20, a second panel 30, a seal 40, an evacuated space 50, a gas adsorbent 60, a plurality of pillars 70, and a closing member 80.

Figure 3:
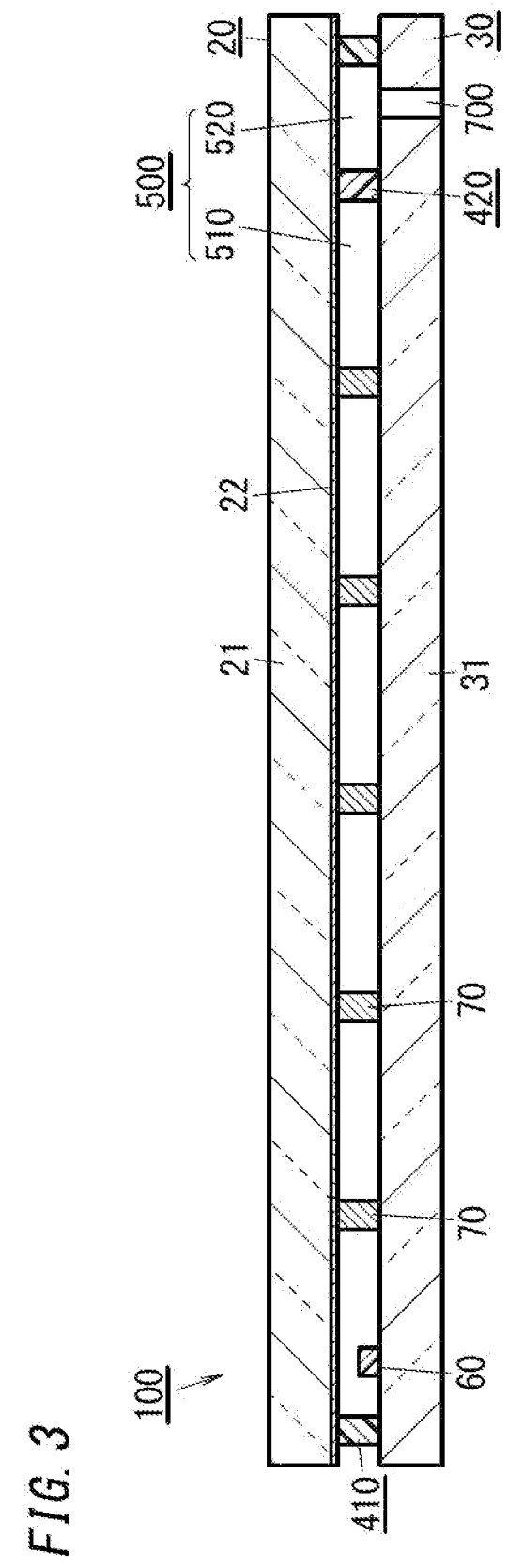
FIG. 3 is a schematic cross-sectional view of an assembly of the glass panel unit.
Figure 4A:
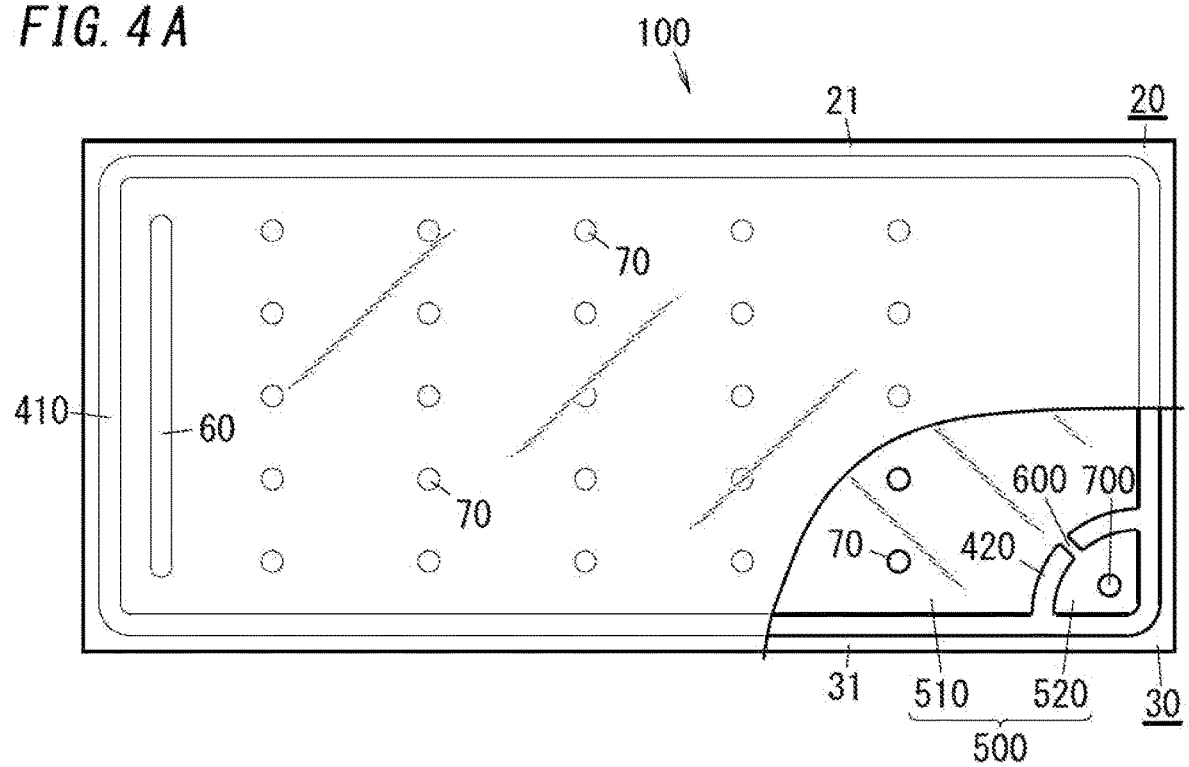
FIG. 4A is a partially cutaway, schematic plan view of the assembly.

The glass panel unit 10 is obtained by processing an assembly 100 as an intermediate product shown in FIGS. 3 and 4A.

The assembly 100 includes at least the first panel 20, the second panel 30, a hot glue (including a frame member 410 and a partition 420 to be described later), and the pillars 70, and has an exhaust port 700. Specifically, according to the first embodiment, the assembly 100 includes the first panel 20, the second panel 30, the frame member 410 and partition 420 serving as a hot glue, an internal space 500, an air passage 600, the exhaust port 700, the gas adsorbent 60, and the plurality of pillars 70.

The first panel 20 includes a first glass pane 21 defining the planar shape of the first panel 20 and a coating 22.

The first glass pane 21 is a rectangular flat plate and has a first surface (the lower surface shown in FIG. 3) and a second surface (the upper surface shown in FIG. 3) on both sides in the thickness direction. The first and second surfaces are parallel to each other. The first glass pane 21 with the rectangular shape may have a length of about 1360 mm to about 2350 mm each side, and a thickness of about 1 mm to about 20 mm, for example. However, these numerical values are only examples and should not be construed as limiting. Examples of materials for the first glass pane 21 include soda lime glass, high strain point glass, chemically tempered glass, alkali-free glass, quartz glass, Neoceram, and thermally tempered glass.

The coating 22 is formed on the first surface of the first glass pane 21. In the first embodiment, a so-called "Low-E (low-emissivity)" film is formed as the coating 22 on the first surface of the first glass pane 21. The coating 22 does not have to be a Low-E film but may also be any other film with desired physical properties. Optionally, the first panel 20 may consist of the first glass pane 21. In other words, the first panel 20 includes at least the first glass pane 21. In the first embodiment, the Low-E film is formed by sputtering as the coating 22 on the first surface of the first glass pane 21.

The second panel 30 includes a second glass pane 31 defining the planar shape of the second panel 30. The second glass pane 31 is a rectangular flat plate and has a first surface (the upper surface shown in FIG. 3) and a second surface (the lower surface shown in FIG. 3) on both sides in the thickness direction. The first and second surfaces of the second glass pane 31 are parallel to each other and are flat surfaces.

The second glass pane 31 may have the same planar shape and same planar dimensions as the first glass pane 21. That is to say, the second panel 30 may have the same planar shape as the first panel 20. Also, the second glass pane 31 may be as thick as the first glass pane 21. Examples of materials for the second glass pane 31 include soda lime glass, high strain point glass, chemically tempered glass, alkali-free glass, quartz glass, Neoceram, and thermally tempered glass.

The second panel 30 may consist of the second glass pane 31. That is to say, the second glass pane 31 may be the second panel 30 itself. Optionally, the second panel 30 may have a coating on either surface thereof. The coating is a film with desired physical properties (such as an infrared reflective film). In that case, the second panel 30 is made up of the second glass pane 31 and the coating. In short, the second panel 30 includes at least the second glass pane 31.

The second panel 30 is arranged to face the first panel 20. Specifically, the first panel 20 and the second panel 30 are arranged such that the first surface of the first glass pane 21 and the first surface of the second glass pane 31 are parallel to each other and face each other.

The frame member 410 is arranged between the first panel 20 and the second panel 30 to hermetically bond the first panel 20 and the second panel 30 together. Thus, an internal space 500 is formed which is surrounded with the frame member 410, the first panel 20, and the second panel 30.

The frame member 410 is made of a hot glue (which is a first hot glue with a first softening point). The first hot glue may include a glass frit and a resin as a binder, for example. The glass frit may be a low-melting glass frit, for example. Examples of the low-melting glass frits include a bismuth-based glass frit, a lead-based glass frit, and a vanadium-based glass frit.

The frame member 410 has a rectangular frame shape. The planar shape of the frame member 410 may be substantially the same as that of the first glass pane 21 and the second glass pane 31. However, the frame member 410 has smaller planar dimensions than the first glass pane 21 and the second glass pane 31. The frame member 410 is formed along the outer periphery of the upper surface of the second panel 30 (i.e., the first surface of the second glass pane 31). That is to say, the frame member 410 is formed to surround almost the entire region on the second panel 30 (i.e., the first surface of the second glass pane 31 almost entirely).

The first panel 20 and the second panel 30 are hermetically bonded together with the frame member 410 by once melting the first hot glue of the frame member 410 at a predetermined temperature which is equal to or higher than the first softening point.

The partition 420 is arranged in the internal space 500. The partition 420 partitions the internal space 500 into a hermetically sealed space, i.e., a first space 510 which will be hermetically sealed to form an evacuated space 50 when the glass panel unit 10 is completed, and a gas exhausting space, i.e., a second space 520 communicating with the exhaust port 700. The partition 420 is provided closer to a first end (i.e., the right end in FIG. 4A) along the length of the second panel 30 (i.e., the rightward/leftward direction in FIG. 4A) than to a middle of the length of the second panel 30 such that the first space 510 becomes larger than the second space 520.

The partition 420 is made of a hot glue (i.e., a second hot glue having a second softening point). The second hot glue may include a glass frit and a resin as a binder, for example. The glass frit may be a low-melting glass frit, for example. Examples of the low-melting glass frits include a bismuth-based glass frit, a lead-based glass frit, and a vanadium-based glass frit. The second hot glue is the same as the first hot glue. The second softening point is equal to the first softening point. In the first embodiment, the softening point (i.e., first softening point and the second softening point) of the hot glue may be 442° C. However, the softening point of the hot glue does not have to be 442° C.

Figure 4B:
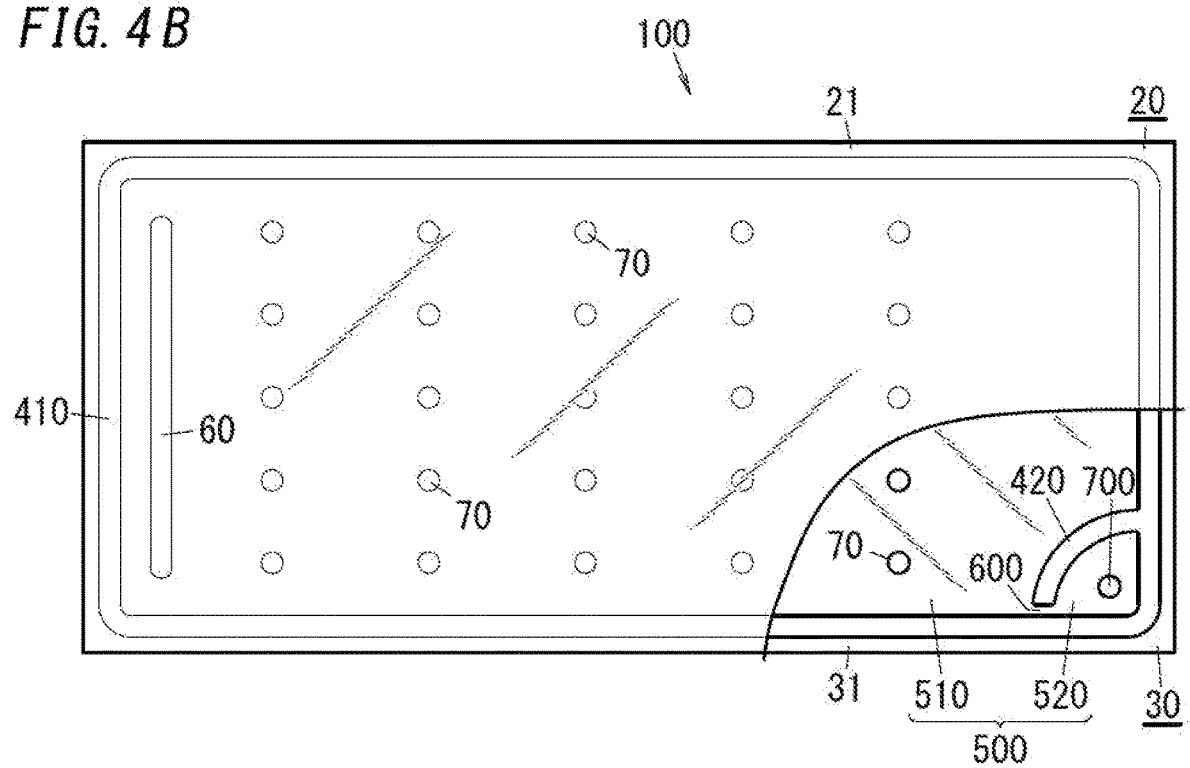
FIG. 4B is a partially cutaway, schematic plan view of a variation of the assembly.

An air passage 600 that allows the first space 510 to communicate with the second space 520 is provided through a part of the partition 420. Alternatively, the air passage 600 may also be provided between the frame member 410 and the partition 420 as shown in FIG. 4B, instead of the part of the partition 420.

As shown in FIG. 4A, the exhaust port 700 is a hole that connects the second space 520 to an external environment. The exhaust port 700 is used to exhaust a gas from the first space 510 through the second space 520 and the air passage 600. The exhaust port 700 is provided through the second panel 30 to connect the second space 520 to the external environment. Specifically, the exhaust port 700 is provided at a corner portion of the second panel 30. In the first embodiment, the exhaust port 700 is provided for the second panel 30. However, this is only an example and should not be construed as limiting. The exhaust port 700 may be provided for the first panel 20, or the second panel 30, or a part of the hot glue forming the frame member 410.

The gas adsorbent 60 is arranged in the first space 510. Specifically, the gas adsorbent 60 has an elongate shape and is arranged at a second end along the length of the second panel 30 (i.e., the left end in FIG. 4A) to extend along the width of the second panel 30. That is to say, the gas adsorbent 60 is arranged at an end of the first space 510 (evacuated space 50), thus making the gas adsorbent 60 less conspicuous. In addition, the gas adsorbent 60 is provided at some distance from the partition 420 and the air passage 600. This reduces, when a gas is being exhausted from the first space 510, the chances of the gas adsorbent 60 interfering with the gas exhaustion.

The gas adsorbent 60 is used to adsorb an unnecessary gas (such as a residual gas). The unnecessary gas is produced by vaporization of the resin included as a binder in the hot glue when the hot glue to be the frame member 410 and the partition 420 is heated, for example.

The gas adsorbent 60 includes a getter. The getter is a material having the property of adsorbing molecules smaller in size than a predetermined one. The getter may be an evaporative getter, for example. The evaporative getter has the property of releasing adsorbed molecules when heated to a predetermined temperature (activation temperature) or more. This allows, even if the adsorption ability of the evaporative getter deteriorates, the evaporative getter to recover its adsorption ability by being heated to the activation temperature or more. The evaporative getter may be a zeolite or an ion-exchanged zeolite (such as a copper-ion-exchanged zeolite).

The gas adsorbent 60 includes a powder of this getter. Specifically, the gas adsorbent 60 may be formed by applying a solution in which a powder of the getter is dispersed. This reduces the size of the gas adsorbent 60, thus allowing the gas adsorbent 60 to be arranged even when the evacuated space 50 is narrow.

The plurality of pillars 70 is used to maintain a predetermined gap between the first panel 20 and the second panel 30. That is to say, the plurality of pillars 70 serves spacers to maintain the gap distance between the first panel 20 and the second panel 30 at a desired value.

The plurality of pillars 70 are placed in the first space 510. Specifically, the plurality of pillars 70 are arranged at the intersections of a rectangular (either square or rectangular) grid. The interval between the plurality of pillars 70 may be at least 2 cm, for example. Note that the dimensions, number, interval, and arrangement pattern of the pillars 70 may be selected appropriately.

The pillars 70 may be made of a transparent material. However, this is only an example and should not be construed as limiting. Alternatively, the pillars 70 may also be made of an opaque material if the dimensions of the pillars 70 are sufficiently small. The material for the pillars 70 is selected to prevent the pillars 70 from being deformed in any of the first melting step, the evacuation step, or the second melting step to be described later. For example, the material for the pillars 70 is selected to have a softening point (softening temperature) higher than the first softening point of the first hot glue and the second softening point of the second hot glue.

The closing member 80 is used to reduce the chances of dust, dirt or any other foreign particles entering the second space 520 through the exhaust port 700. In the first embodiment, the closing member 80 may be a lid 81 provided on the surface of the exhaust port 700 of the first panel 20 or the second panel 30.

Providing such a closing member 80 for the exhaust port 700 reduces the chances of dust, dirt or any other foreign particles entering the second space 520 through the exhaust port 700. This reduces the chances of the dust, dirt or any other foreign particles that have entered either the exhaust port 700 or the second space 520 adversely affecting the appearance of the glass panel unit 10. Optionally, such a closing member 80 may be omitted.

Next, a method for manufacturing the glass panel unit 10 according to the first embodiment will be described with reference to FIGS. 5-8. The glass panel unit manufacturing method according to the first embodiment includes a glue arrangement step, an assembly forming step, a first melting step, an evacuation step, and a second melting step. Optionally, the manufacturing method may further include other additional process steps as needed. These manufacturing process steps will be described one by one.

According to the first embodiment, first, a substrate forming step is performed, although not shown in any of the drawings. The substrate forming step is the process step of forming the first panel 20 and the second panel 30. Specifically, the substrate forming step may include, for example, making the first panel 20 and the second panel 30. Optionally, the substrate forming step may include cleaning the first panel 20 and the second panel 30 as needed.

Next, the step of providing the exhaust port 700 is performed. In this process step, the exhaust port 700 is provided through the second panel 30. Alternatively, the exhaust port 700 may be provided through the first panel 20 or may be provided through a hot glue to be arranged in the glue arrangement step to be described later. That is to say, the exhaust port 700 is provided through at least one of the first panel 20, the second panel 30, or the hot glue.

Figure 5:
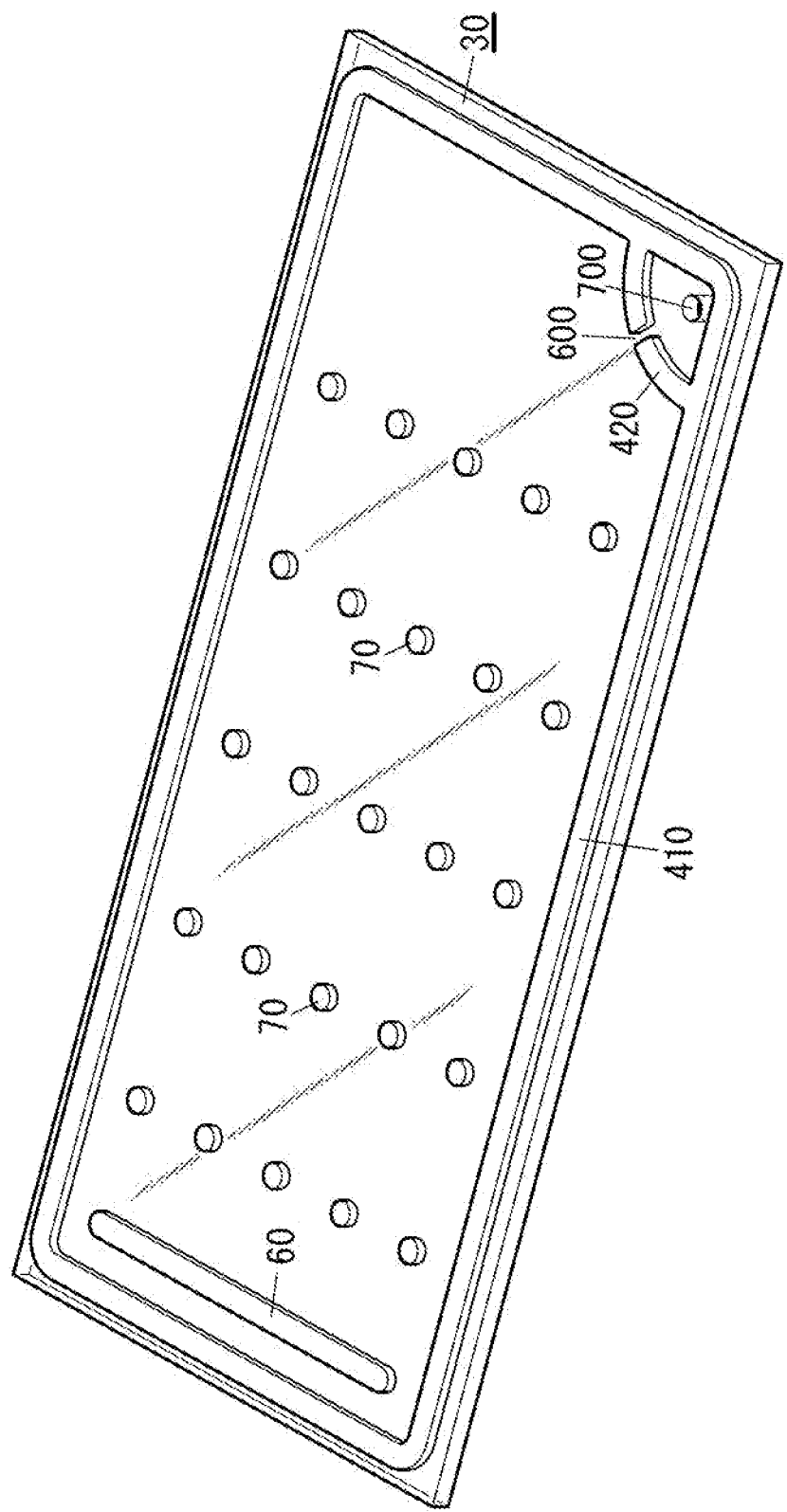
FIG. 5 illustrates a method for manufacturing the glass panel unit.

Next, as shown in FIG. 5, the glue arrangement step is performed. The glue arrangement step is the step of arranging a hot glue on either the first panel 20 or the second panel 30. Specifically, the glue arrangement step includes forming a frame member 410 and a partition 420 on the second panel 30. The glue arrangement step includes applying, with a dispenser, for example, a material for the frame member 410 (i.e., a first hot glue) and a material for the partition 420 (i.e., a second hot glue) onto the second panel 30 (i.e., the first surface of the second glass pane 31). In the first embodiment, the air passage 600 is formed in the glue arrangement step.

Optionally, the glue arrangement step may include drying and pre-baking the material for the frame member 410 and the material for the partition 420. For example, the second panel 30 on which the material for the frame member 410 and the material for the partition 420 are applied may be heated. If necessary, the first panel 20 may also be heated along with the second panel 30. That is to say, the first panel 20 and the second panel 30 may be heated under the same condition. Such prebaking may be omitted.

Next, the pillar placement step is performed. The pillar placement step is the step of placing pillars 70 on either the first panel 20 or the second panel 30. Specifically, the pillar placement step includes forming a plurality of pillars 70 in advance and placing, using a chip mounter, for example, the plurality of pillars 70 at predetermined positions on the second panel 30. The plurality of pillars 70 may be formed by photolithographic and etching techniques. In that case, the plurality of pillars 70 may be made of a photocurable material, for example. Alternatively, the plurality of pillars 70 may also be formed by a known thin film forming technique. When measured from the upper surface of the second panel 30, the height of the pillars 70 mounted on the second panel 30 is lower than the height of the hot glue mounted on the second panel 30.

Next, the gas adsorbent forming step is performed. Specifically, the gas adsorbent forming step includes forming a gas adsorbent 60 by applying a solution in which a powder of a getter is dispersed onto a predetermined region on the second panel 30 and drying the solution. Note that the glue arrangement step, the pillar placement step, and the gas adsorbent forming step may be performed in any arbitrary order.

Figure 6:
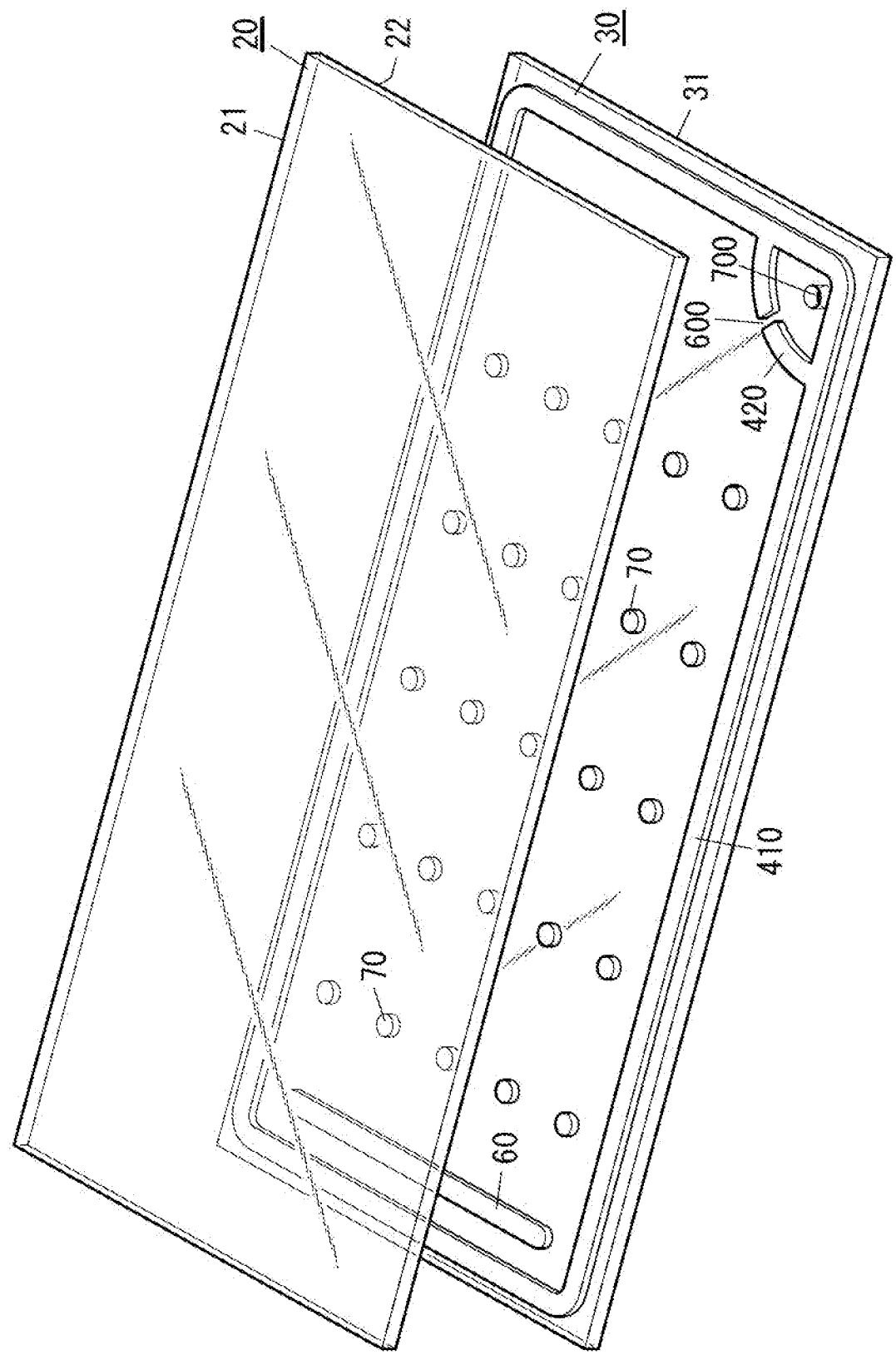
FIG. 6 illustrates the method for manufacturing the glass panel unit.

Next, the assembly forming step is performed. As shown in FIG. 6, the assembly forming step includes forming an assembly 100 (see FIGS. 3 and 4A) by arranging the second panel 30 such that the second panel 30 faces the first panel 20.

The first panel 20 and the second panel 30 are arranged such that the first surface of the first glass pane 21 and the first surface of the second glass pane 31 are parallel to each other and face each other and laid one on top of the other. Performing this assembly forming step brings the hot glue into contact with the first panel 20 and the second panel 30, thus forming the assembly 100 shown in FIGS. 3 and 4.

Figure 7:
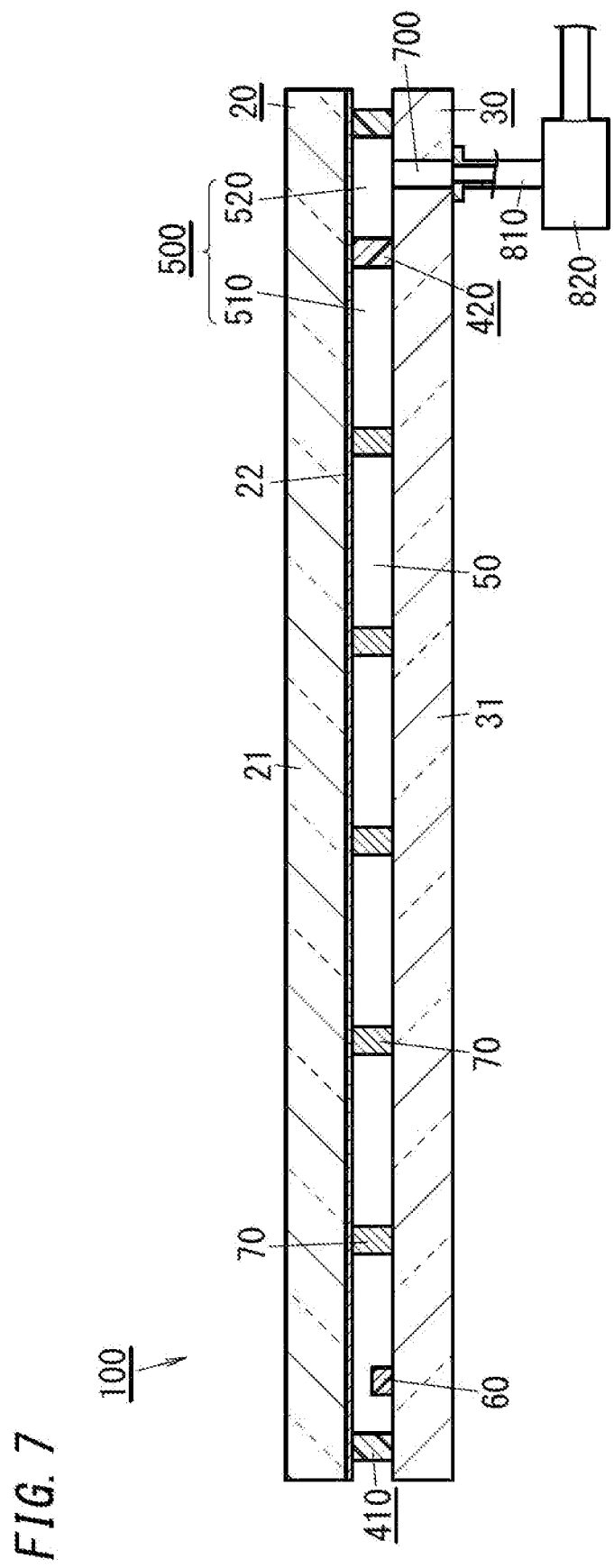
FIG. 7 illustrates the method for manufacturing the glass panel unit.

Next, the assembly mounting step is performed. The assembly mounting step includes mounting the assembly 100 on a supporting stage (not shown) of a melting furnace (not shown) as shown in FIG. 7. In this case, only one supporting stage may be arranged in the melting furnace or a plurality of supporting stages may be arranged as a set in the melting furnace. In the latter case, the respective upper surfaces of the supporting stages are level with each other. The upper surface of the supporting stage(s) is suitably a horizontal plane.

In addition, a vacuum pump is connected to the assembly 100 via an exhaust pipe 810 and a sealing head 820. The exhaust pipe 810 is bonded to the second panel 30 such that the inside of the exhaust pipe 810 communicates with the exhaust port 700, for example. Then, the sealing head 820 is attached to the exhaust pipe 810. In this manner, a suction port of the vacuum pump is connected to the exhaust port 700.

Next, the first melting step (bonding step) is performed. The first melting step includes heating the assembly 100 and melting the hot glue to bond the first panel 20 and the second panel 30 together with the hot glue and thereby form an internal space 500. The internal space 500 is a space surrounded, except the exhaust port 700, with the first panel 20, the second panel 30, and the hot glue melted.

The first melting step and the evacuation step and second melting step following the first melting step are performed with the assembly 100 still loaded in the melting furnace.

The first melting step includes hermetically bonding the first panel 20 and the second panel 30 together by once melting the first hot glue at a predetermined temperature (melting temperature) Tm equal to or higher than the first softening point. The first melting step is divided into a first temperature raising step, a first temperature maintaining step, and a first temperature lowering step according to temperature variations.

Figure 8:
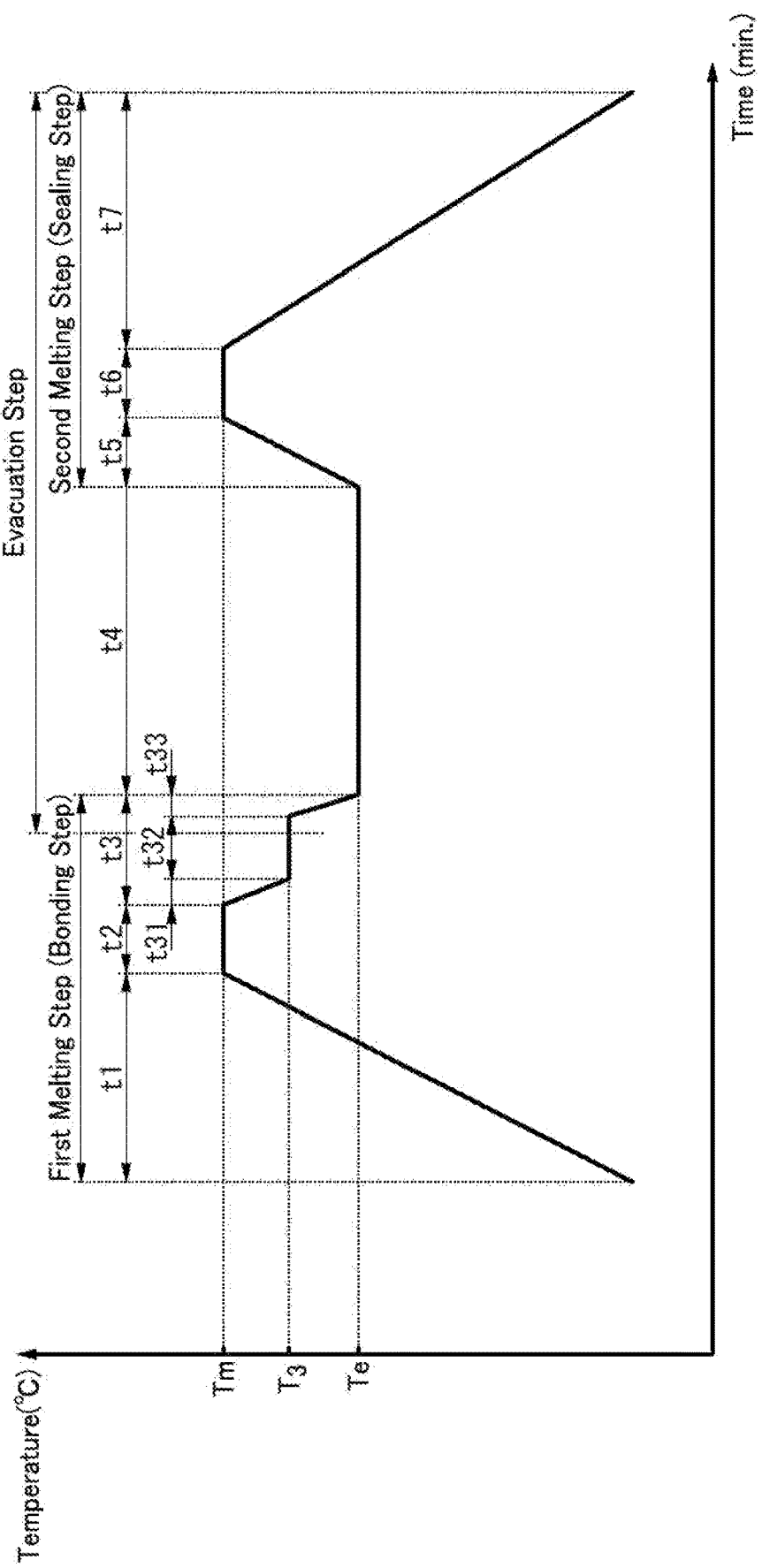
FIG. 8 shows a temperature chart according to the method for manufacturing the glass panel unit.

The first temperature raising step is the process step performed for the time period t1 shown in FIG. 8 and including raising the temperature in the melting furnace from ordinary temperature to the melting temperature Tm. In the first temperature raising step, the resin included as a binder in the hot glue is going to vaporize off the hot glue to cause a decrease in the content of the residual resin to the hot glue. Leaving such a resin in the glass panel unit 10 as a final product would cause deterioration in the adhesion performance of the hot glue. In addition, the residual resin vaporized would be released into the evacuated space 50, thus causing a decrease in the degree of vacuum of the evacuated space 50, which could eventually cause a significant decline in thermal insulation performance.

To decrease the content of the residual resin to the hot glue, the lower the temperature increase rate in the first temperature raising step is (i.e., the longer the time it takes to perform the first temperature raising step is), the better. Specifically, the temperature increase rate in the first temperature raising step is suitably at most 5° C./min, more suitably 3.5° C./min or less, and even more suitably 2° C./min or less. The time period t1 for which the first temperature raising step is performed may be 276 minutes, for example. In that case, the temperature increase rate is less than 2° C./min.

The first temperature maintaining step is the process step performed for the time period t2 shown in FIG. 8 and including maintaining the temperature in the melting furnace at the melting temperature Tm.

The first panel 20 and the second panel 30 are loaded into the melting furnace and are heated at the melting temperature Tm for a predetermined amount of time (first melting time) t2 in the first temperature maintaining step as shown in FIG. 8.

The melting temperature Tm and the first melting time t2 are defined such that the first panel 20 and the second panel 30 are hermetically bonded together with the hot glue of the frame member 410 but that the air passage 600 is not closed by the partition 420. That is to say, the lower limit of the melting temperature Tm is the first softening point, but the upper limit of the melting temperature Tm is set to prevent the air passage 600 from being closed by the partition 420. For example, if the first softening point and the second softening point are 442° C., the melting temperature Tm is set at 460° C. Note that the melting temperature Tm may be determined as appropriate to fall within the range from a temperature higher than the first softening point by several ° C. (e.g., from 3° C. to 5° C.) to temperature higher than the first softening point by 10-30° C. or even by more than 30° C.

Also, the first melting time t2 may be 15 minutes, for example. Note that in the first melting step, a gas is emitted from the frame member 410 but is adsorbed into the gas adsorbent 60.

In the first temperature lowering step to be performed after the first temperature maintaining step, the first hot glue that has been once melted is going to cure, so are the first panel 20 and the second panel 30.

The first temperature lowering step is the process step to be performed for the time period t3 shown in FIG. 8 and includes lowering the temperature in the melting furnace from the melting temperature Tm to a predetermined temperature (exhaustion temperature) Te to be described later. The first temperature lowering step is subdivided into an anterior temperature lowering step, a middle temperature maintaining step, and a posterior temperature lowering step.

The anterior temperature lowering step is the process step to be performed for the time period t31 shown in FIG. 8 and includes lowering the temperature in the melting furnace from the melting temperature Tm to a temperature to maintain T3. The time period t31 for which the anterior temperature lowering step is performed may be 12 minutes, for example.

The middle temperature maintaining step is the process step to be performed for the time period t32 shown in FIG. 8 and includes maintaining the temperature in the melting furnace at the temperature to maintain T3. The time period t32 for which the middle temperature maintaining step is performed may be 12 minutes, for example. Also, the temperature to maintain T3 is a temperature lower than the second softening point. For example, if the second softening point is 442° C., then the temperature to maintain T3 may be set at 430° C. Note that the time period t32 for which the middle temperature maintaining step is performed does not have to be 12 minutes but is suitably at least equal to 5 minutes, more suitably 10 minutes or more, and even more suitably 15 minutes or more.

The posterior temperature lowering step is the process step to be performed for the time period t33 shown in FIG. 8 and includes lowering the temperature in the melting furnace to the predetermined temperature (exhaustion temperature) Te to be described later. The time period t33 for which the posterior temperature lowering step is performed may be 12 minutes, for example.

Maintaining the temperature of the first panel 20 and the second panel 30 at the melting temperature Tm for the first melting time t2 as described above in the first temperature maintaining step allows the first panel 20 and the second panel 30 to be hermetically bonded together with the hot glue of the frame member 410. In addition, the melting temperature Tm and the first melting time t2 are determined to prevent the air passage 600 from being closed by the partition 420. After the first melting step (strictly speaking, before the first melting step ends), the evacuation step is performed. If any part of the partition 420 had a temperature higher than the second softening point, that part could be deformed to close the air passage 600 while the gas is being exhausted.

In the first embodiment, the middle temperature maintaining step is provided in the middle of the first temperature lowering step. This contributes to making the temperature of the first panel 20 and the second panel 30 more uniform and also making the temperature of the entire partition 420 lower than the second softening point. This reduces the chances of any part of the partition 420 being deformed to close the air passage 600 during the evacuation step.

Next, the evacuation step is performed. The evacuation step includes reducing pressure in the internal space 500 by evacuation that involves exhausting a gas from the internal space 500 via the exhaust port 700.

The exhaustion may be carried out using a vacuum pump (not shown). The vacuum pump exhausts the gas from the internal space 500 via the sealing heads 820, the exhaust pipes 810, and the exhaust port 700.

The evacuation step is subdivided into a first temperature lowering step, a second temperature maintaining step, a second temperature raising step, a third temperature maintaining step, and a second temperature lowering step according to temperature variations.

The first temperature lowering step of the evacuation step partially overlaps with the first temperature lowering step of the first melting step preceding the evacuation step. That is to say, in the middle of the first temperature lowering step of the first melting step, the evacuation step is started. In the first embodiment, the evacuation step may be started in 10 minutes, for example, since the middle temperature maintaining step of the first temperature lowering step has been started. Alternatively, the evacuation step does not have to be started during the first temperature lowering step but may be started during the second temperature maintaining step that follows the first temperature lowering step.

The second temperature maintaining step is the process step to be performed for the time period t4 shown in FIG. 8 and includes maintaining the temperature in the melting furnace at the exhaustion temperature Te. In the second temperature maintaining step, the gas is exhausted from the first space 510 via the air passage 600, the second space 520, and the exhaust port 700.

The exhaustion temperature Te is set at a temperature higher than the activation temperature (of 350° C., for example) of the getter of the gas adsorbent 60 but lower than the first softening point and the second softening point (of 442° C., for example). The exhaustion temperature Te may be 400° C., for example.

This prevents the frame member 410 and the partition 420 from being deformed. In addition, this activates the getter of the gas adsorbent 60, thus causing the molecules (gas) adsorbed into the getter to be released from the getter. Then, the molecules (i.e., the gas) released from the getter are exhausted via the first space 510, the air passage 600, the second space 520, and the exhaust port 700. Thus, the evacuation step allows the gas adsorbent 60 to recover its adsorption ability.

The exhaustion time t4 is set to create an evacuated space 50 with a desired degree of vacuum (e.g., a degree of vacuum of 0.1 Pa or less). The exhaustion time t4 may be set at 120 minutes, for example. Note that the degree of vacuum of the evacuated space 50 is not particularly limited.

The second temperature raising step, the third temperature maintaining step, and the second temperature lowering step following the second temperature maintaining step overlap with the second melting step following the second temperature maintaining step. That is to say, in the second temperature raising step, the third temperature maintaining step, and the second temperature lowering step, the evacuation step and the second melting step are performed in parallel.

Next, the second melting step (sealing step) is performed. The second melting step includes creating a hermetically sealed evacuated space 50 by closing the exhaust port 700 and sealing the internal space 500 while maintaining the reduced pressure in the internal space 500.

The second temperature raising step is the process step to be performed for the time period t5 shown in FIG. 8 and includes raising the temperature in the melting furnace from the exhaustion temperature Te to the melting temperature Tm.

In the second temperature raising step, if the temperature increase rate were too high, then the dispersion in temperature inside the first panel 20 and the second panel 30 could increase so significantly as to cause cracks in the first panel 20 and the second panel 30. That is why in the second temperature raising step, the temperature increase rate is suitably as low as possible. Specifically, the temperature increase rate in the second temperature raising step is suitably at most 3° C./min, more suitably 2° C./min or less, and even more suitably 1.5° C./min or less.

The third temperature maintaining step is the process step to be performed for the time period t6 shown in FIG. 8 and includes maintaining the temperature in the melting furnace at the melting temperature Tm.

The third temperature maintaining step includes melting the second hot glue once at a melting temperature Tm equal to or higher than the second softening point to deform the partition 420 and thereby form a boundary wall 42 closing the air passage 600. Specifically, the first panel 20 and the second panel 30 are heated at the melting temperature Tm for a predetermined amount of time (second melting time) t6 in the melting furnace.

The partition 420 contains the second hot glue. Thus, melting the second hot glue once at the melting temperature Tm that is equal to or higher than the second softening point allows the partition 420 to be deformed into the boundary wall 42 shown in FIGS. 1 and 2.

The melting temperature Tm and the second melting time t6 are set such that the second hot glue softens to form the boundary wall 42 that closes the air passage 600. The melting temperature Tm may be set at 460° C., for example, as described above. Also, the second melting time t6 may be 30 minutes, for example.

The second temperature lowering step is the process step to be performed for the time period t7 shown in FIG. 8 and includes lowering the temperature in the melting furnace from the melting temperature Tm to the ordinary temperature.

In the second temperature lowering step, if the temperature decrease rate were too high, then the dispersion in temperature inside the first panel 20 and the second panel 30 could increase so significantly as to cause cracks in the first panel 20 and the second panel 30. That is why in the second temperature lowering step, the temperature decrease rate is suitably as low as possible. Specifically, the temperature decrease rate in the second temperature lowering step is suitably at most 5° C./min, more suitably 3° C./min or less, and even more suitably 2.5° C./min or less.

After the second temperature lowering step has been performed, the glass panel unit 10 will be unloaded from the melting furnace.

The glass panel unit 10 thus obtained includes the first panel 20, the second panel 30, the seal 40, the evacuated space 50, the second space 520, the gas adsorbent 60, the plurality of pillars 70, and the closing member 80 as shown in FIG. 2.

The evacuated space 50 is formed by exhausting a gas from the first space 510 via the second space 520 and the exhaust port 700 as described above. In other words, the evacuated space 50 is the first space 510, of which the degree of pressure reduction is equal to or less than a predetermined value. The predetermined value may be 0.1 Pa, for example. The evacuated space 50 is hermetically closed completely by the first panel 20, the second panel 30, and the seal 40, and therefore, is separated from the second space 520 and the exhaust port 700.

The seal 40 not only surrounds the evacuated space 50 entirely but also hermetically bonds the first panel 20 and the second panel 30 together. The seal 40 has the shape of a frame including a first part 41 and a second part (boundary wall 42). The first part 41 is a portion, corresponding to the evacuated space 50, of the frame member 410. That is to say, the first part 41 is a portion, facing the evacuated space 50, of the frame member 410. The second part is the boundary wall 42 obtained by deforming the partition 420.

Next, a method for manufacturing a glass panel unit 10 according to a second embodiment will be described with reference to FIG. 9. The method for manufacturing the glass panel unit 10 according to the second embodiment is mostly the same as the method for manufacturing the glass panel unit 10 according to the first embodiment. Thus, in the following description, their common features will not be described all over again to avoid redundancies.

Figure 9:
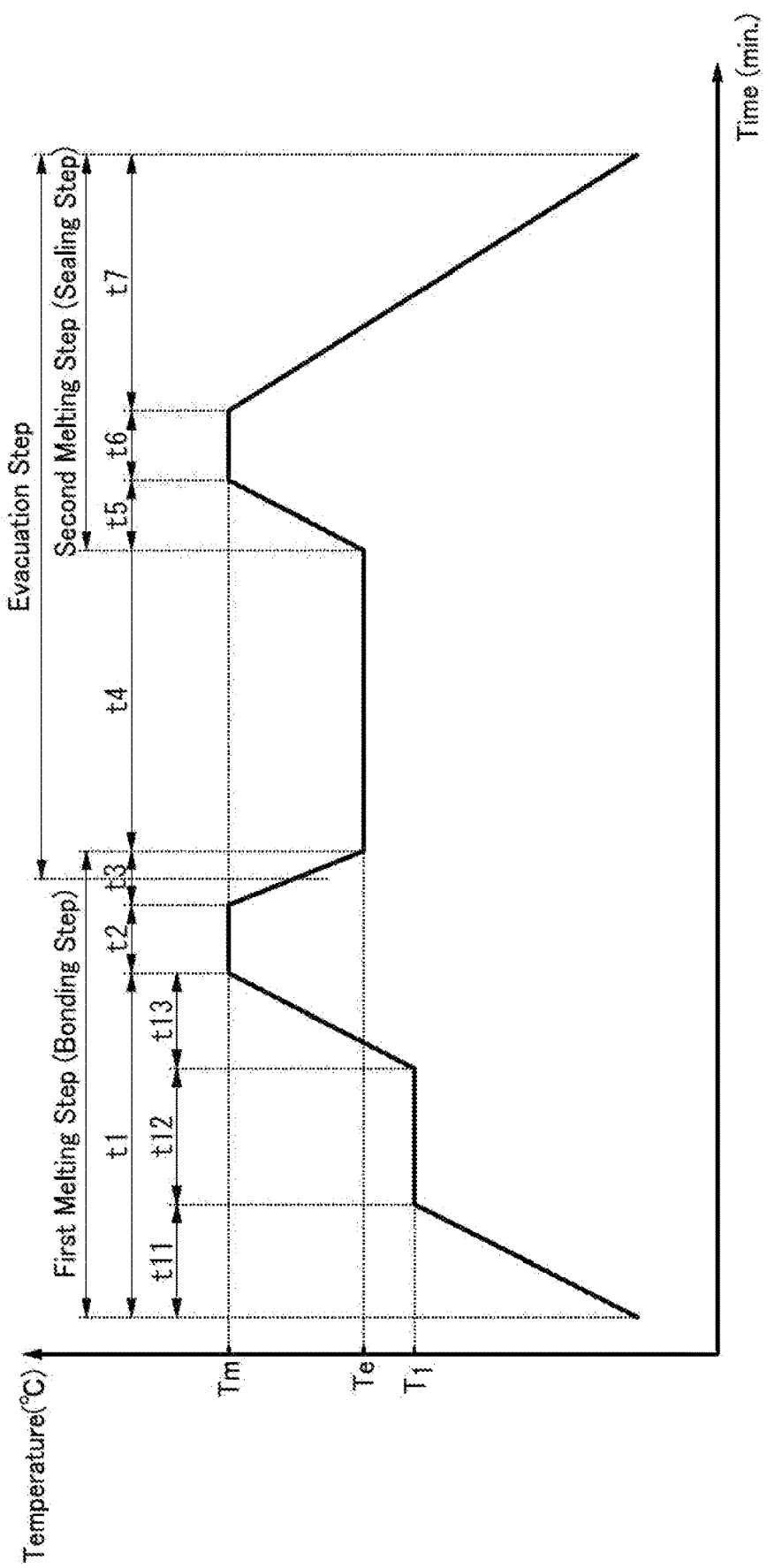
FIG. 9 shows a temperature chart according to a method for manufacturing a glass panel unit according to a second embodiment.

According to the second embodiment, the first temperature lowering step is not subdivided into the anterior temperature lowering step, the middle temperature maintaining step, and the posterior temperature lowering step as is done in the first embodiment, but is the step of lowering the temperature monotonically for the time period t3 shown in FIG. 9. The time period t3 may be 24 minutes, for example. However, this value only an example and should not be construed as limiting. The evacuation step may be started in 10 minutes, for example, since the start of the first temperature lowering step. However, the time to start the evacuation step is not limited to any particular timing.

According to the second embodiment, the first temperature raising step is subdivided into an anterior temperature raising step, a middle temperature maintaining step, and a posterior temperature raising step, unlike the first embodiment.

The anterior temperature raising step is the process step to be performed for the time period t11 shown in FIG. 9 and includes raising the temperature in the melting furnace from the ordinary temperature to a temperature to maintain T1. The time period t11 for which the anterior temperature raising step is performed may be 180 minutes, for example.

The middle temperature maintaining step is the process step to be performed for the time period t12 shown in FIG. 9 and includes maintaining the temperature in the melting furnace at the temperature to maintain T1. The time period t12 for which the middle temperature maintaining step is performed may be 60 minutes, for example. Also, the temperature to maintain T1 is a temperature lower than the first softening point. For example, if the first softening point is 442° C., then the temperature to maintain T1 may be set at 300° C. Note that the time period t12 for which the middle temperature maintaining step is performed does not have to be 60 minutes.

The posterior temperature raising step is the process step to be performed for the time period t13 shown in FIG. 9 and includes raising the temperature in the melting furnace from the temperature to maintain T1 to a melting temperature Tm to be described later. The time period t13 for which the posterior temperature raising step is performed may be 96 minutes, for example.

The middle temperature maintaining step is provided in the middle of the first temperature raising step, thus making the temperature of the first panel 20 and the second panel 30 more uniform and reducing the chances of causing respective parts of the first panel 20 and the second panel 30 to have a temperature lower than the melting temperature Tm during the first temperature maintaining step performed for the time period t2.

In addition, providing the middle temperature maintaining step in the middle of the first temperature raising step extends the duration t1 of the first temperature raising step to the point of easily reducing, or even eliminating, residual resin left in the hot glue.

Also, as in the first embodiment described above, the temperature increase rate in the first temperature raising step is suitably at most 5° C./min, more suitably 3.5° C./min or less, and even more suitably 2° C./min or less.

Figure 10:
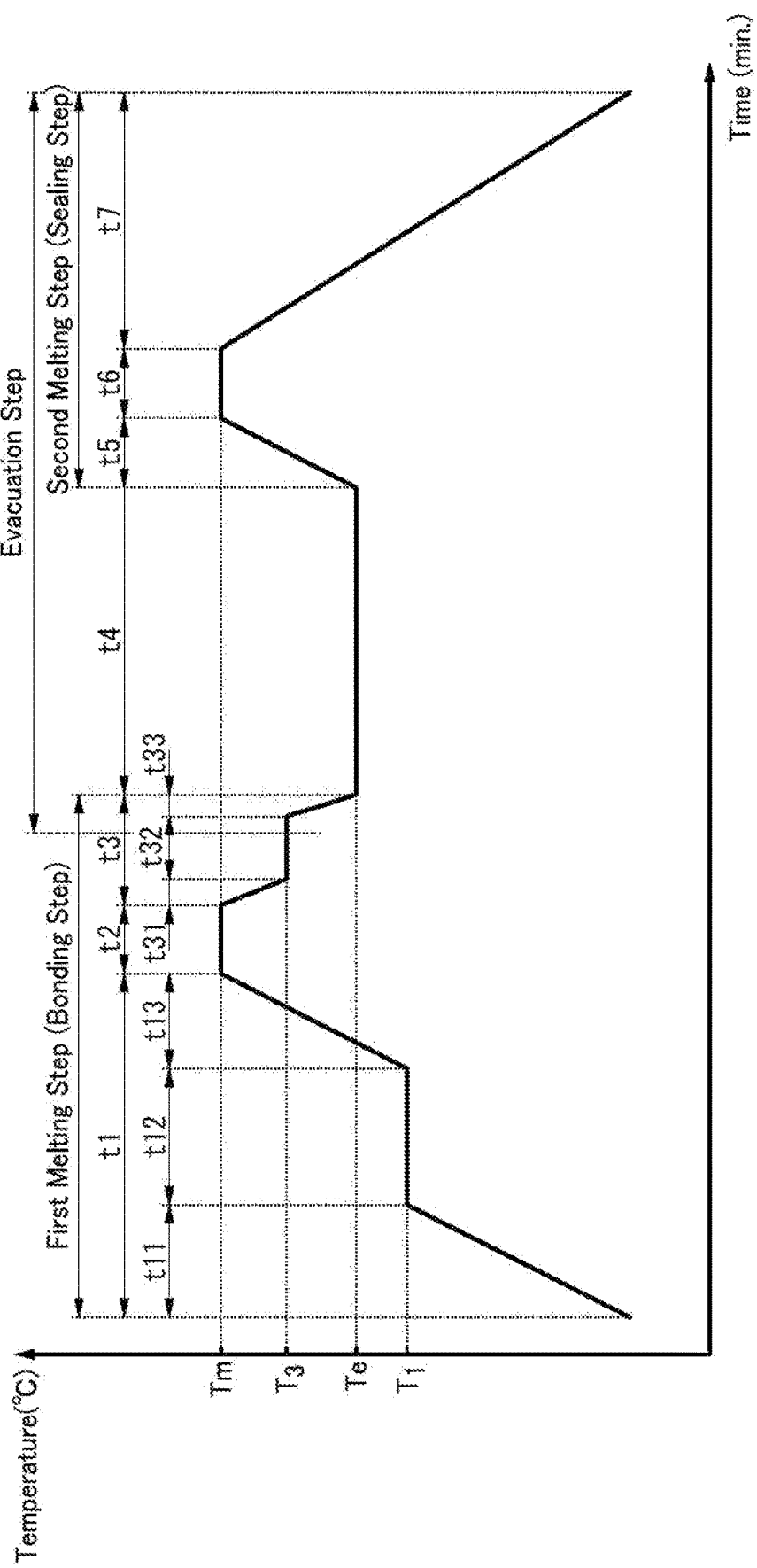
FIG. 10 shows a temperature chart according to a method for manufacturing a glass panel unit according to a third embodiment.

Next, a method for manufacturing a glass panel unit 10 according to a third embodiment will be described with reference to FIG. 10. The method for manufacturing the glass panel unit 10 according to the third embodiment is mostly the same as the method for manufacturing the glass panel unit 10 according to the first embodiment. Thus, in the following description, their common features will not be described all over again to avoid redundancies.

According to the third embodiment, only the first temperature raising step is different from the counterpart of the first embodiment, and is subdivided into an anterior temperature raising step, a middle temperature maintaining step, and a posterior temperature raising step. The first temperature raising step is the same as the counterpart of the second embodiment described above, and detailed description thereof will be omitted herein.

According to the third embodiment, the middle temperature maintaining step is provided in the middle of the first temperature lowering step as in the first embodiment, thus making the temperature of the first panel 20 and the second panel 30 more uniform and causing the entire partition 420 to have a temperature lower than the second softening point. This reduces the chances of a part of the partition 420 being deformed to close the air passage 600 during the evacuation step.

In addition, according to the third embodiment, providing the middle temperature maintaining step in the middle of the first temperature raising step makes the temperature of the first panel 20 and the second panel 30 more uniform and reduces the chances of causing respective parts of the first panel 20 and the second panel 30 to have a temperature lower than the melting temperature Tm during the first temperature maintaining step performed for the time period t2.

In addition, providing the middle temperature maintaining step in the middle of the first temperature raising step extends the duration t1 of the first temperature raising step to the point of easily reducing, or even eliminating, residual resin left in the hot glue.

Next, variations of the first to third embodiments will be described.

In the embodiments described above, the glass panel unit 10 has a rectangular shape. However, this is only an example and should not be construed as limiting. Alternatively, the glass panel unit 10 may also have a circular, polygonal, or any other desired shape. That is to say, the first panel 20, the second panel 30, and the seal 40 do not have to be rectangular but may also have a circular, polygonal, or any other desired shape. In addition, the respective shapes of the first panel 20, the second panel 30, the frame member 410, and the boundary wall 42 do not have to be the ones used in the embodiment described above, but may also be any other shapes that allow a glass panel unit 10 of a desired shape to be obtained. Note that the shape and dimensions of the glass panel unit 10 may be determined according to the intended use of the glass panel unit 10.

Neither the first surface nor second surface of the first glass pane 21 of the first panel 20 has to be a plane. Likewise, neither the first surface nor second surface of the second glass pane 31 of the second panel 30 has to be a plane.

The first glass pane 21 of the first panel 20 and the second glass pane 31 of the second panel 30 do not have to have the same planar shape and planar dimensions. The first glass pane 21 and the second glass pane 31 do not have to have the same thickness, either. In addition, the first glass pane 21 and the second glass pane 31 do not have to be made of the same material, either.

The seal 40 does not have to have the same planar shape as the first panel 20 and the second panel 30. Likewise, the frame member 410 does not have to have the same planar shape as the first panel 20 and the second panel 30, either.

Optionally, the first panel 20 may include a coating having desired physical properties and formed on the second surface of the first glass pane 21. Alternatively, the first panel 20 may have no coatings 22. That is to say, the first panel 20 may consist of the first glass pane 21 alone.

Furthermore, the second panel 30 may include a coating with desired physical properties. The coating may include at least one of thin films respectively formed on the first and second surfaces of the second glass pane 31, for example. The coating may be an infrared reflective film or ultraviolet reflective film that reflects light with a particular wavelength, for example.

Furthermore, in the embodiments described above, the frame member 410 is made of the first hot glue. However, this is only an example and should not be construed as limiting. Alternatively, the frame member 410 may include not only the first hot glue but also a core material or any other material as well. That is to say, the frame member 410 needs to include at least the first hot glue. Furthermore, in the embodiments described above, the frame member 410 is formed to cover the second panel 30 almost entirely. However, this is only an example and should not be construed as limiting. Rather the frame member 410 needs to be formed to cover a predetermined area on the second panel 30. That is to say, the frame member 410 does not have to be formed to cover almost the entire area on the second panel 30.

Furthermore, in the embodiments described above, the partition 420 is made of the second hot glue. However, this is only an example and should not be construed as limiting. Alternatively, the partition 420 may include not only the second hot glue but also a core material or any other material as well. That is to say, the partition 420 needs to include at least the second hot glue.

In the embodiments described above, the internal space 500 is partitioned into a single first space 510 and a single second space 520. Optionally, the internal space 500 may also be partitioned into one or more first spaces 510 and one or more second spaces 520.

The first glue and the second hot glue do not have to be glass frit and a glue including resin as a binder but may also be a low-melting metal or a hot melt adhesive, for example.

In the embodiments described above, a melting furnace is used to heat the frame member 410, the gas adsorbent 60, and the partition 420. However, heating may be conducted by any appropriate heating means. The heating means may be a laser beam or a heat transfer plate connected to a heat source, for example.

In the embodiments described above, the exhaust port 700 is provided through the second panel 30. However, this is only an example and should not be construed as limiting. Alternatively, the exhaust port 700 may be provided through the first glass pane 21 of the first panel 20 or through the frame member 410.

With the exhaust port 700 provided through the frame member 410 of the hot glue, when the first panel 20 and the second panel 30 are pressed by the atmospheric pressure in directions in which the first and second panels 20, 30 approach each other during the second melting step (sealing step), the frame member 410 is pressed and deformed, thus closing the exhaust port 700.

Note that the temperatures (e.g., 442° C. as the softening point of the hot glue) adopted in the embodiment described above do not have to be exactly equal to the specified ones but may have a predetermined error (e.g., within the range of ±5° C. or ±10° C. or whatever appropriate) with respect to the specified ones, as far as the desired advantage is achieved substantially.

Also, the temperature, durations, and other specific values adopted in the embodiments described above are only examples and should not be construed as limiting.

As can be seen from the foregoing description of embodiments, a method for manufacturing a glass panel unit (10) according to a first aspect includes a glue arrangement step, an assembly forming step, a first melting step, an evacuation step, and a second melting step.

The glue arrangement step includes arranging a hot glue on either a first panel (20) including a first glass pane (21) or a second panel (30) including a second glass pane (31).

The assembly forming step includes forming an assembly (100) including the first panel (20), the second panel (30), and the hot glue and having an exhaust port (700) provided through at least one of the first panel (20), the second panel (30), or the hot glue by arranging the second panel (30) such that the second panel (30) faces the first panel (20).

The first melting step includes heating the assembly (100) to melt the hot glue, bonding the first panel (20) and the second panel (30) together with the hot glue thus melted, and thereby forming an internal space (500) surrounded, except the exhaust port (700), with the first panel (20), the second panel (30), and the hot glue melted.

The evacuation step includes reducing pressure in the internal space (500) by evacuation that involves exhausting a gas from the internal space (500) via the exhaust port (700).

The second melting step includes creating a hermetically sealed evacuated space (50) by heating the assembly (100) and thereby melting the hot glue while maintaining a reduced pressure in the internal space (500) to close the exhaust port (700) and seal the internal space (500) up.

The first melting step includes a temperature raising step (first temperature raising step), a temperature maintaining step, and a temperature lowering step (first temperature lowering step), which are performed in this order. The temperature raising step (first temperature raising step) includes raising a temperature of the assembly (100) to a temperature equal to or higher than a softening point of the hot glue. The temperature maintaining step includes maintaining the temperature of the assembly (100) at the temperature equal to or higher than the softening point.

The temperature lowering step (first temperature lowering step) includes lowering the temperature of the assembly (100) to a temperature less than the softening point.

The temperature lowering step (first temperature lowering step) includes: an anterior temperature lowering step including lowering the temperature of the assembly (100); a middle temperature maintaining step including maintaining the temperature of the assembly (100); and a posterior temperature lowering step including lowering the temperature of the assembly (100). The anterior temperature lowering step, the middle temperature maintaining step, and the posterior temperature lowering step are performed in this order.

In the method for manufacturing a glass panel unit (10) according to the first aspect, a middle temperature maintaining step is provided in the middle of the temperature lowering step (first temperature lowering step), thus contributing to making the temperature of the assembly (100) more uniform and reducing the chances of a part of the partition (420) being deformed to close the air passage (600) during the evacuation step.

A method for manufacturing a glass panel unit (10) according to a second aspect may be implemented in combination with the first aspect. In the second aspect, the temperature raising step (first temperature raising step) includes: an anterior temperature raising step including raising the temperature of the assembly (100); a middle temperature maintaining step including maintaining the temperature of the assembly (100); and a posterior temperature raising step including raising the temperature of the assembly (100). The anterior temperature raising step, the middle temperature maintaining step, and the posterior temperature raising step are performed in this order.

In the method for manufacturing a glass panel unit (10) according to the second aspect, a middle temperature maintaining step is provided in the middle of the temperature raising step (first temperature raising step), thus extending the duration (t1) of the temperature raising step (first temperature raising step) to the point of easily reducing, or even eliminating, residual resin left in the hot glue.

A method for manufacturing a glass panel unit (10) according to a third aspect may be implemented in combination with the first or second aspect. In the third aspect, the method includes: maintaining the temperature of the assembly (100) at a temperature less than the softening point in the middle temperature maintaining step of the temperature lowering step (first temperature lowering step), and starting the evacuation step at a point in time during the middle temperature maintaining step of the temperature lowering step (first temperature lowering step).

The method for manufacturing a glass panel unit (10) according to the third aspect contributes to making the temperature of the assembly (100) more uniform and causing the entire partition (420) to have a temperature lower than the softening point, thus further reducing the chances of a part of the partition (420) being deformed to close the air passage (600) during the evacuation step.

REFERENCE SIGNS LIST

10 Glass Panel Unit
20 First Panel
21 First Glass Pane
30 Second Panel
31 Second Glass Pane
50 Evacuated Space
100 Assembly
500 Internal Space
600 Air Passage
700 Exhaust Port

The invention claimed is:

1. A method for manufacturing a glass panel unit, the method comprising:

a glue arrangement step including arranging a hot glue on either a first panel or a second panel, the first panel including a first glass pane, the second panel including a second glass pane;

an assembly forming step including forming an assembly, wherein the assembly includes the first panel, the second panel, and the hot glue, and the assembly has an exhaust port provided through at least one of the first panel, the second panel, or the hot glue by arranging the second panel such that the second panel faces the first panel;

a first melting step including heating the assembly to melt the hot glue, bonding the first panel and the second panel together with the hot glue thus melted, and thereby forming an internal space surrounded, except the exhaust port, with the first panel, the second panel, and the hot glue melted;

an evacuation step including reducing pressure in the internal space by evacuation that involves exhausting a gas from the internal space via the exhaust port; and a second melting step including creating a hermetically sealed evacuated space by heating the assembly and thereby melting the hot glue while maintaining a reduced pressure in the internal space to close the exhaust port and seal the internal space up, wherein the first melting step includes:
- a temperature raising step including raising a temperature of the assembly to a temperature equal to or higher than a softening point of the hot glue;
- a temperature maintaining step including maintaining the temperature of the assembly at the temperature equal to or higher than the softening point; and
- a temperature lowering step including lowering the temperature of the assembly to a temperature less than the softening point, wherein the temperature raising step, the temperature maintaining step, and the temperature lowering step are performed in this order, the temperature lowering step including:
- an anterior temperature lowering step including lowering the temperature of the assembly;
- a first middle temperature maintaining step including maintaining the temperature of the assembly for 5 minutes or more; and
- a posterior temperature lowering step including lowering the temperature of the assembly, wherein the anterior temperature lowering step, the first middle temperature maintaining step, and the posterior temperature lowering step are performed in this order, and in a middle of the temperature lowering step of the first melting step, the evacuation step is started.

2. The method of claim 1, wherein
the temperature raising step includes:
- an anterior temperature raising step including raising the temperature of the assembly;
- a second middle temperature maintaining step including maintaining the temperature of the assembly; and
- a posterior temperature raising step including raising the temperature of the assembly, and wherein the anterior temperature raising step, the second middle temperature maintaining step, and the posterior temperature raising step are performed in this order.

3. The method of claim 1, including
maintaining the temperature of the assembly at a temperature less than the softening point in the first middle temperature maintaining step, and
starting the evacuation step at a point in time during the first middle temperature maintaining step.

* * * * *